United States Patent
Lu et al.

(10) Patent No.: US 12,479,953 B2
(45) Date of Patent: Nov. 25, 2025

(54) TERNARY POLYMER DONOR MATERIAL, PREPARATION METHOD AND APPLICATION THEREOF

(71) Applicants: Taizhou University, Taizhou (CN); Taizhou Huimo Technology Co., Ltd, Taizhou (CN)

(72) Inventors: Shirong Lu, Taizhou (CN); Liu Zhu, Taizhou (CN)

(73) Assignees: Taizhou University, Taizhou (CN); Taizhou Huimo Technology Co., Ltd, Taizhou (CN)

( * ) Notice: Subject to any disclaimer, the term of this patent is extended or adjusted under 35 U.S.C. 154(b) by 500 days.

(21) Appl. No.: 18/145,886

(22) Filed: Dec. 23, 2022

(65) Prior Publication Data

US 2023/0303764 A1    Sep. 28, 2023

(30) Foreign Application Priority Data

Dec. 31, 2021    (CN) .......................... 202111669331.0

(51) Int. Cl.
    *C08G 61/12*    (2006.01)
    *B01J 23/44*    (2006.01)
    *B01J 27/18*    (2006.01)

(52) U.S. Cl.
    CPC ............ *C08G 61/126* (2013.01); *B01J 23/44* (2013.01); *B01J 27/18* (2013.01); *C08G 2261/3243* (2013.01)

(58) Field of Classification Search
    None
    See application file for complete search history.

(56) References Cited

U.S. PATENT DOCUMENTS

2020/0140605 A1*  5/2020  Liao ..................... H10K 85/151

FOREIGN PATENT DOCUMENTS

| CN | 107880062 A | * | 4/2018 | .......... C07D 519/00 |
|---|---|---|---|---|
| CN | 111278888 A | | 6/2020 | |
| CN | 113024779 A | | 6/2021 | |
| WO | 2021136435 A1 | | 7/2021 | |

OTHER PUBLICATIONS

Liang, et al., "Random Polymerization Strategy Leads to a Family of Donor Polymers Enabling Well-Controlled Morphology and Multiple Cases of High-Performance Organic Solar Cells", Advanced Materials, 32, 2003500, 2020. (Year: 2020).*
CN107880062 English machine translation (Year: 2025).*
Notice of first Office action dated Sep. 15, 2023 in SIPO application No. CN202111669331.0, 11 pages.
Retrieval report—First search dated Sep. 13, 2023 in SIPO application No. CN202111669331.0, 5 pages.
Notification to Grant Patent Right for Invention dated Nov. 6, 2024 in SIPO application No. CN202111669331.0, 3 pages.
Notice of nth Office action dated Jun. 27, 2024 in SIPO application No. CN202111669331.0, 12 pages.
Shiwei Qu et al, "Fine Tuning of Open-Circuit Voltage by Chlorination in Thieno[3,4-b]thiophene-Benzodithiophene Terpolymers toward Enhanced Solar Energy Conversion", Macromolecules, Jun. 27, 2017, pp. 4962-4971, vol. 50.

* cited by examiner

*Primary Examiner* — Christopher M Rodd
(74) *Attorney, Agent, or Firm* — Cooper Legal Group, LLC

(57) ABSTRACT

Disclosed are a ternary polymer donor material, a preparation method and application thereof. The ternary polymer donor material is prepared by Still cross-coupling reaction of chlorinated thiophene (BDT-2Cl), fluorinated thiophene (BDT-2F) and brominated thiophene (BDT-2Br). Terpolymer synthesized in the application is a ternary polymeric donor material based on synergistic effect of fluorine (F) and chlorine (Cl), molecular energy levels of the ternary polymeric donor material are effectively adjusted by controlling contents of the BDT-2Cl, thereby showing graded voltage change, and a balance between driving force and energy loss is achieved through the synergistic effect of the F and the Cl.

8 Claims, 5 Drawing Sheets

TERNARY POLYMER DONOR MATERIAL, PREPARATION METHOD AND APPLICATION THEREOF

CROSS-REFERENCE TO RELATED APPLICATIONS

This application claims priority of Chinese Patent Application No. 202111669331.0, filed on Dec. 31, 2021, the entire contents of which are incorporated herein by reference.

TECHNICAL FIELD

The present application generally relates to organic polymer photovoltaic devices or organic semiconductor thin film solar cells, further to polymer donor materials, and in particular to a ternary polymer donor material, a preparation method and application thereof.

BACKGROUND

As one of the most potential clean energy technologies, polymer solar cells (PSCs) have attracted much attention in recent years because of outstanding advantages such as light weight, strong flexibility, good solution-processability and low production cost. With development of organic photovoltaic materials and device engineering, a growing number of the high-performance PSCs with high power conversion efficiency (PCE) have come out. In past few years, non-fullerene receptor materials have shown strong light-trapping ability and high photoelectric conversion efficiency, and improved the PCE again and again. In addition, polymer donor materials, as an important part of active layers, play a vital role in high-performance photovoltaic devices.

For the high-performance PSCs, the polymer donor materials usually have following intrinsic characteristics: (1) the polymer donor materials and acceptors have complementary light absorption to maximally utilize a spectrum; (2) the polymer donor materials have appropriate molecular energy levels between highest occupied molecular orbital (HOMO) and the lowest unoccupied molecular orbital (LUMO) to match molecular energy levels of the acceptors, so as to provide sufficient driving force for exciton diffusion and minimize energy loss; and (3) the polymer donor materials have good compatibility with the acceptors, so as to provide good interface contact, form a good phase morphology and provide an effective way for charge separation. However, at present, it is often faced with the excessive driving force or the excessive energy loss, and difficult to achieve a balance between the driving force and the energy loss.

Based on the above characteristics, in past decade, fluorination and chlorination were often used to adjust the molecular energy levels of polymer donor materials, expand absorption and optimize phase state in design and synthesis of high-performance polymer materials. Unlike fluorine (F) atoms, chlorine (Cl) atoms have an empty 3D orbit and may accept electron pairs or π-electrons to help free electrons. Therefore, chlorination may more effectively reduce the molecular energy levels than fluorination. However, a large atomic radius of the Cl atoms leads to large steric hindrance, which destroys planarity of conjugated polymers and thus affects morphology and photovoltaic performance of the polymer donor materials, especially fill factor (FF) and short-circuit current density ($J_{SC}$).

SUMMARY

An objective of the application is to provide a ternary polymer donor material, a preparation method and application thereof, which is designed and synthesized through fluorination and chlorination, so that the ternary polymer donor material may keep high FF and a $J_{SC}$ while increasing an open-circuit voltage of conjugated polymers.

To achieve the above objective, the present application provides a ternary polymer donor material, including a following chemical structural formula:

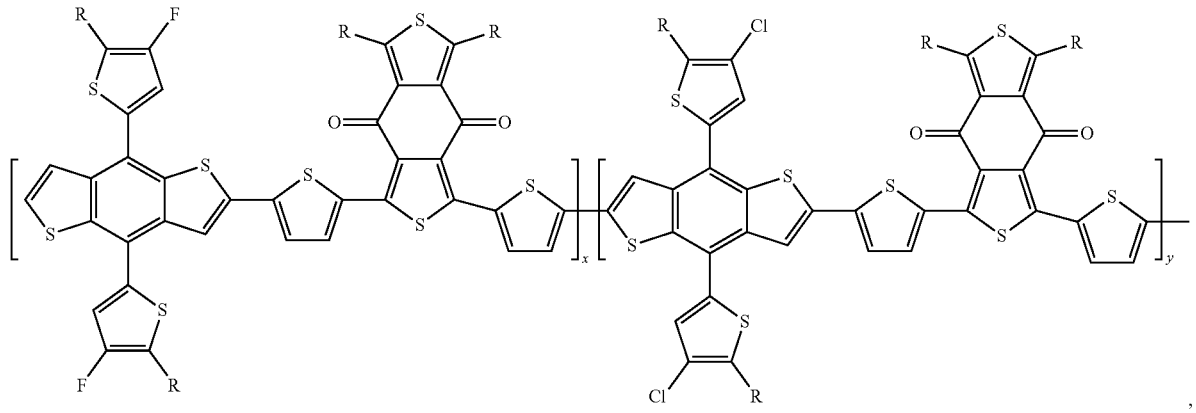

where a component x accounts for 90-20 percent (%) of a molar content of the ternary polymer donor material, and a component y accounts for 10-80% of the molar content of the ternary polymer donor material.

Further, the component x and the component y account for 90% and 10%, 80% and 20%, 50% and 50%, or 20% and 80% of the molar content of the ternary polymer donor material, and the ternary polymer donor material is named as PM6.1, PM6.2, PM6.5 and PM6.8 according to different molar contents of the component x and molar contents of the component y, respectively.

The application also provides a preparation method of the ternary polymer donor material by Stille cross-coupling reaction of a compound (I), a compound (II) and a compound (III), in which the compound (I), the compound (II) and the compound (III) include following chemical structural formulas:

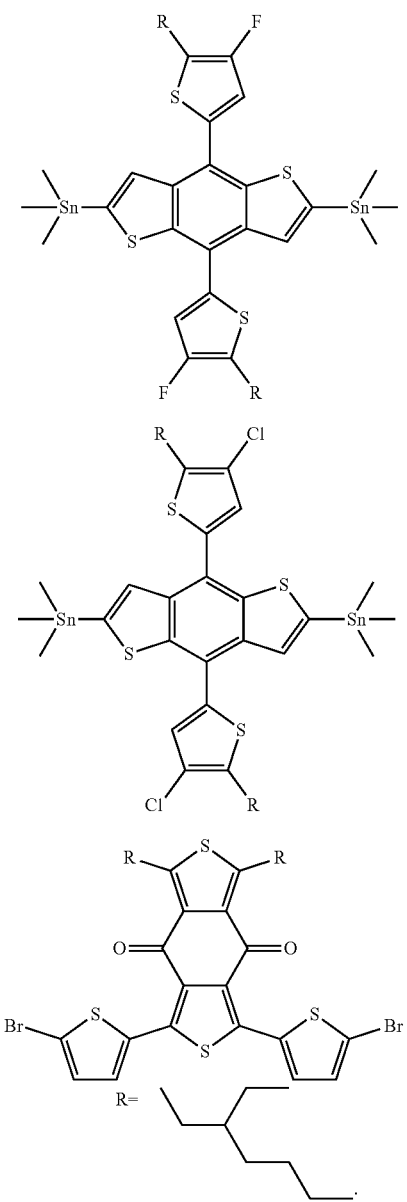

Further, the preparation method includes: dissolving the compound (I), the compound (II) and the compound (III) in an organic solvent, adding a catalyst into the organic solvent, heating and stirring for reaction under an inert gas, and separating as well as purifying a reaction solution after the reaction to obtain the ternary polymer donor material.

Further, a molar ratio of the compound (I), the compound (II) and the compound (III) is (0.9-0.2):(0.1-0.8):1, optionally 0.9:0.1:1, 0.8:0.2:1, 0.5:0.5:1 and 0.2:0.8:1.

Further, the organic solvent is at least one of anhydrous oxygen-free toluene, N,N-dimethylformamide, tetrahydrofuran and anhydrous oxygen-free chlorobenzene, optionally anhydrous oxygen-free toluene.

Further, the catalyst is a palladium catalyst or a combination of the palladium catalyst and a phosphorus catalyst, in which the palladium catalyst is at least one of tris (dibenzylideneacetone) palladium, tetratriphenylphosphine palladium, bis (dibenzylideneacetone) palladium and bis (triphenylphosphine) palladium dichloride, and the phosphorus catalyst is tris (o-methylphenyl) phosphorus.

Further, an amount of the catalyst accounts for 2-20% of a total molar content of the compound (I), the compound (II) and the compound (III), optionally 6-18%.

Further, when the catalyst is the palladium catalyst, an amount of the palladium catalyst accounts for 8-10% of the total molar content of the compound (I), the compound (II) and the compound (III); when the catalyst is the combination of the palladium catalyst and the phosphorus catalyst, the amount of the palladium catalyst accounts for 4-12% of the total molar content of the compound (I), the compound (II) and the compound (III), and an amount of the phosphorus catalyst accounts for 2-6% of the total molar content of the compound (I), the compound (II) and the compound (III).

Further, heating temperature is 100-120 degree Celsius (° C.), optionally 110° C.

Further, reaction duration is more than or equal to 0.2 hour (h), optionally 0.2-5 h.

Further, when the catalyst is the palladium catalyst, the reaction duration is 1-5 h; when the catalyst is the combination of the palladium catalyst and the phosphorus catalyst, the reaction duration is 0.2-1 h.

Further, a number-average molecular weight ($M_n$) of the ternary polymer donor material is 10-50 kilodalton (kDa).

A molecular weight of the ternary polymer donor material depends on the reaction duration and the catalyst. When the catalyst is the palladium catalyst, the $M_n$ of the ternary polymer donor material is 10 kDa after the reaction for 0.5 h, the $M_n$ of the ternary polymer donor material is 15 kDa after the reaction for 1 h, the $M_n$ of the ternary polymer donor material is 30 kDa after the reaction for 2 h, and the $M_n$ of the ternary polymer donor material is 50 kDa after the reaction for 5 h.

When the catalyst is the combination of the palladium catalyst and the phosphorus catalyst, the $M_n$ of the ternary polymer donor material is 5 kDa after the reaction for 0.2 h, the $M_n$ of the ternary polymer donor material is 15 kDa after the reaction for 0.5 h, the $M_n$ of the ternary polymer donor material is 30 kDa after the reaction for 0.7 h, and the $M_n$ of the ternary polymer donor material is 50 kDa after the reaction for 1 h.

Further, the inert gas is nitrogen or argon.

Further, the separating and purifying the reaction solution include:

stopping heating after the reaction, pouring the reaction solution into methanol when a reaction system is cooled to room temperature to generate a precipitate, filtering and collecting the precipitate, extracting the precipitate with the methanol, acetone and n-hexane in sequence by a Soxhlet extractor, removing the products with the low molecular weights, extracting the precipitate in the Soxhlet extractor with chloroform until the precipitate is colorless, and removing the chloroform by rotary evaporation to obtain crude products, chromatographing the crude products by silica columns to obtain the ternary polymer donor material with the uniform molecular weights.

Further, in the separating and purifying the reaction solution, an amount of the methanol is more than 20 times of volume of the reaction solution.

Further, in the separating and purifying the reaction solution, the precipitate is extracted by the Soxhlet extractor with the methanol, the acetone and the n-hexane in sequence for 10-15 h, optionally 12 h.

Further, in the separating and purifying the reaction solution, the crude products are chromatographed with the silica columns of 100-200 meshes with the pure chloroform as an eluent.

The application provides application of the ternary polymer donor material in preparing organic polymer photovoltaic devices or organic solar cells.

The application provides an organic solar cell device, including the ternary polymer donor material.

Further, the organic solar cell device includes an acceptor material, and the acceptor material is Y6, N3 or BTP-eC9.

Further, the organic solar cell device includes an anode material, and the anode material is indium tin oxide (ITO).

Further, the organic solar cell device includes an anode modification layer (a hole transport layer), and anode modification layer materials are PEDOT:PSS, in which the PEDOT is a polymer of EDOT (3,4-ethylenedioxythiophene monomer), namely poly (3,4-ethylenedioxythiophene), and PSS is polystyrene sulfonate.

Further, the organic solar cell device includes a cathode modification layer (an electron transport layer), and a cathode modification layer material is Phen-NaDPO.

Further, the organic solar cell device includes a silver (Ag) cathode.

Further, the organic solar cell device adopts a positive device structure.

The application has following effects.

In the application, a graded terpolymer is synthesized by introducing different contents of chlorinated thiophene (BDT-2Cl) and fluorinated thiophene (BDT-2F) in a random copolymerization for the first time. The terpolymer is a ternary polymeric donor material based on synergistic effect of F and Cl, molecular energy levels of the ternary polymeric donor material are effectively adjusted by controlling ending groups of the BDT-2Cl, thereby showing graded voltage change, and a balance between driving force and energy loss is achieved through the synergistic effect of the F and the Cl. Moreover, the ternary polymer donor material of the application has excellent semiconductor performance, good self-assembly and solution-processability, and the organic solar cells prepared from the ternary polymer donor material has significantly improved photoelectric conversion efficiency. Therefore, the ternary polymer donor material has great application potential and value in the field of the photovoltaic devices such as the organic solar cells.

DETAILED DESCRIPTION

Figure 1:
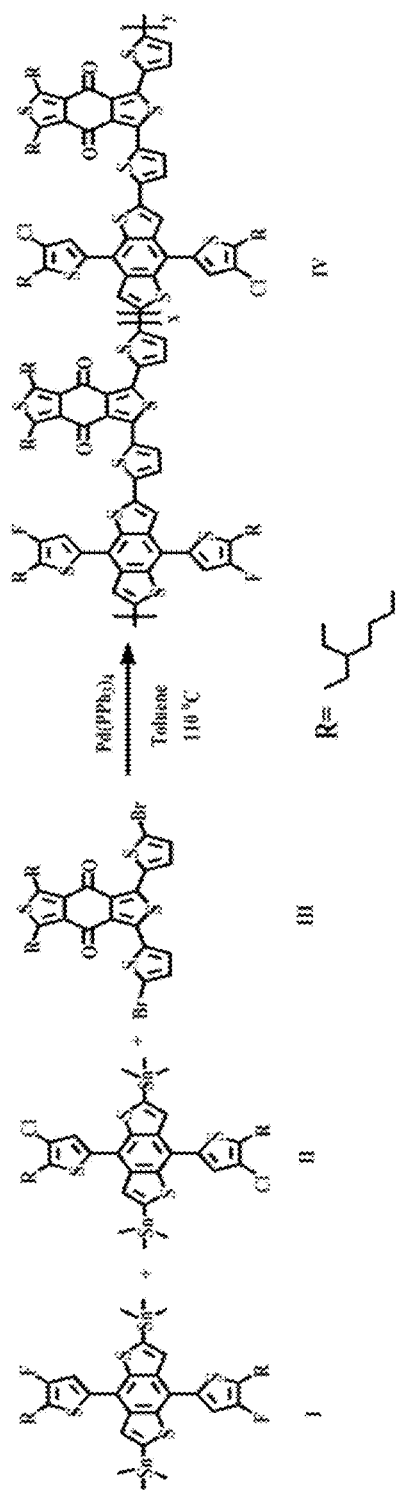
FIG. 1 is a schematic diagram of a synthetic route of a ternary polymer donor material in the application.

The technical schemes of the present application are clearly and completely described below with reference to the drawings, and it is clear that the described embodiments are a part of the embodiments of the present application, and not all of them. Based on the embodiments in the present application, all other embodiments obtained by a person of ordinary skill in the art without making creative labor fall within the scope of protection of the present application.

The application provides a ternary polymer donor material based on synergistic effect of F and Cl, including a following chemical structural formula:

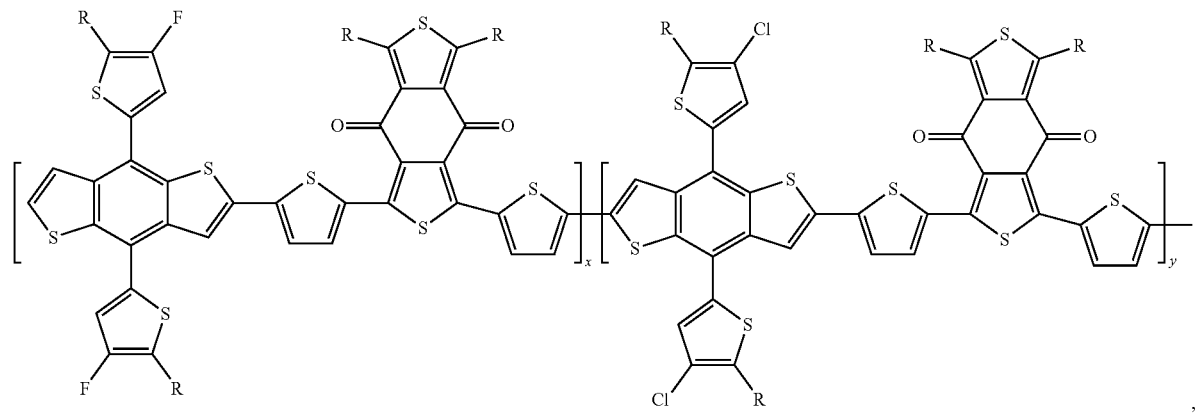

where a component x accounts for 90-20% of a molar content of the donor material, and a component y accounts for 10-80% of the molar content of the donor material.

Further, the component x and the component y account for 90% and 10%, 80% and 20%, 50% and 50%, or 20% and 80% of the molar content of the polymer donor material, and the polymer donor material is named as PM6.1, PM6.2, PM6.5 and PM6.8 according to different molar contents of the component x and molar contents of the component y, respectively.

According to the application, the ternary polymer donor material is prepared by Stille cross-coupling reaction of a compound (I), a compound (II) and a compound (III), in which the compound (I), the compound (II) and the compound (III) include following chemical structural formulas:

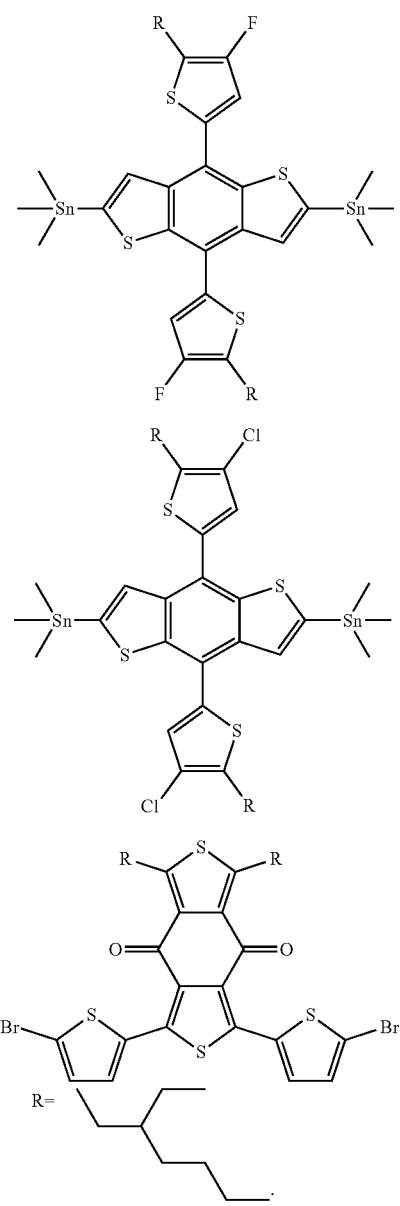

Further, a preparation method of the ternary polymer donor material includes:

S1: dissolving the compound (I), the compound (II) and the compound (III) in an organic solvent, adding a catalyst, heating and stirring for reaction under an inert gas; and S2: separating and purifying a reaction solution: stopping heating after the reaction, pouring the reaction solution into methanol when a reaction system is cooled to room temperature to generate a precipitate, filtering and collecting the precipitate, extracting the precipitate with the methanol, acetone and n-hexane by a Soxhlet extractor for 10-15 h respectively, and removing products with low molecular weights; extracting the precipitate in the Soxhlet extractor with chloroform until the precipitate is colorless, and removing the chloroform by rotary evaporation to obtain crude products, chromatographing the crude products with silica gel columns of 100-200 meshes, in which the pure chloroform is used as a eluent, then separating through the column, and collecting effluent components to obtain the ternary polymer donor material with the uniform molecular weights.

A molar ratio of the compound (I), the compound (II) and the compound (III) is (0.9-0.2):(0.1-0.8):1. The molar ratio of the used compound (II) is adjusted to obtain the ternary polymer donor material PM6.1, PM6.2, PM6.5 and PM6.8, in which the molar ratio of the compound (I), the compound (II) and the compound (III) is 0.9:0.1:1, when preparing the ternary polymer donor material PM6.1; the molar ratio of the compound (I), the compound (II) and the compound (III) is 0.8:0.2:1, when preparing the ternary polymer donor material PM6.2; the molar ratio of the compound (I), the compound (II) and the compound (III) is 0.5:0.5:1, when preparing the ternary polymer donor material PM6.5; the molar ratio of the compound (I), the compound (II) and the compound (III) is 0.2:0.8:1, when preparing the ternary polymer donor material PM6.8.

The organic solvent is at least one of anhydrous oxygen-free toluene, N,N-dimethylformamide, tetrahydrofuran and anhydrous oxygen-free chlorobenzene, optionally anhydrous oxygen-free toluene.

The catalyst is a palladium catalyst or a combination of the palladium catalyst and a phosphorus catalyst, in which the palladium catalyst is at least one of tris (dibenzylideneacetone) palladium, tetratriphenylphosphine palladium, bis (dibenzylideneacetone) palladium and bis (triphenylphosphine) palladium dichloride, and the phosphorus catalyst is tris (o-methylphenyl) phosphorus.

An amount of the catalyst accounts for 2-20% of a total molar content of the compound (I), the compound (II) and the compound (III), optionally 6-18%; further, when the catalyst is the palladium catalyst, an amount of the palladium catalyst accounts for 8-10% of the total molar content of the compound (I), the compound (II) and the compound (III); when the catalyst is the combination of the palladium catalyst and the phosphorus catalyst, the amount of the palladium catalyst is 4-12% of the total molar content of the compound (I), the compound (II) and the compound (III), and an amount of the phosphorus catalyst accounts for 2-6% of the total molar content of the compound (I), the compound (II) and the compound (III).

Heating temperature is 100-120° C., optionally 110° C.

Reaction duration is more than or equal to 0.2 h, optionally 0.2-5 h; further, when the catalyst is the palladium catalyst, the reaction duration is 1-3 h; when the catalyst is the combination of the palladium catalyst and the phosphorus catalyst, the reaction duration is 0.5-1 h.

A molecular weight of the ternary polymer donor material depends on the reaction duration and the catalyst. When the catalyst is the palladium catalyst, a $M_n$ of the ternary polymer donor material is 10 kDa after the reaction for 0.5 h, the $M_n$ of the ternary polymer donor material is 15 kDa after the reaction for 1 h, the $M_n$ of the ternary polymer donor material is 30 kDa after the reaction for 2 h, and the $M_n$ of the ternary polymer donor material is 50 kDa after the reaction for 5 h.

When the catalyst is the combination of the palladium catalyst and the phosphorus catalyst, the $M_n$ of the ternary polymer donor material is 5 kDa after the reaction for 0.2 h, the $M_n$ of the ternary polymer donor material is 15 kDa after the reaction for 0.5 h, the $M_n$ of the ternary polymer donor material is 30 kDa after the reaction for 0.7 h, and the $M_n$ of the ternary polymer donor material is 50 kDa after the reaction for 1 h.

The inert gas is nitrogen or argon.

Figure 3:
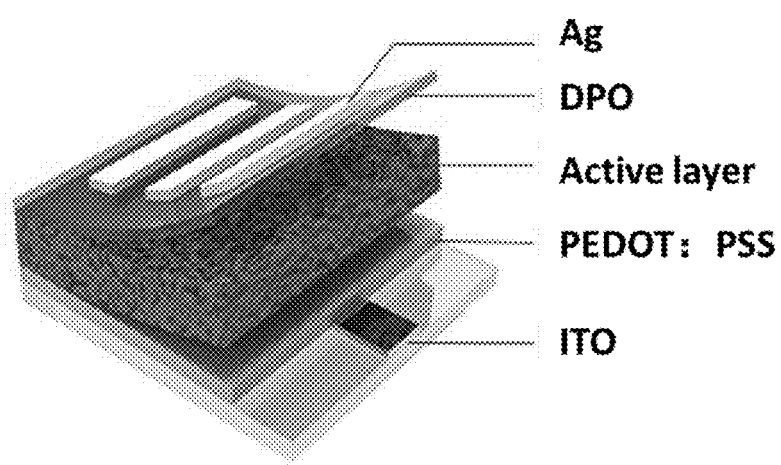
FIG. 3 shows a schematic structural diagram of an organic solar cell device prepared in the application.

According to the application, the above ternary polymer donor material is used as an active layer donor material to prepare an organic solar cell device. Specifically, the organic solar cell device of the application uses a positive device structure: ITO/PEDOT:PSS/donor:PYSe-2FT/Phen-NaDPO/Ag with a structure as shown in FIG. 3, in which ITO glass, anode transparent conductive glass, is used as an anode material; poly(3,4-ethylenedioxythiophene):poly(styrene sulfonate)(PEDOT:PSS) is used an anode modification layer (a hole transport layer); the active layer donor material is the ternary polymer donor material PM6.1, the ternary polymer donor material PM6.2, the ternary polymer donor material PM6.5 or the ternary polymer donor material PM6.8; an active layer acceptor material is Y6; phenyl(2-naphthyl) diphenylphosphine oxide (Phen-NaDPO, DPO) is used as a cathode modification layer (an electron transport layer); the cathode material is Ag.

Figure 2:
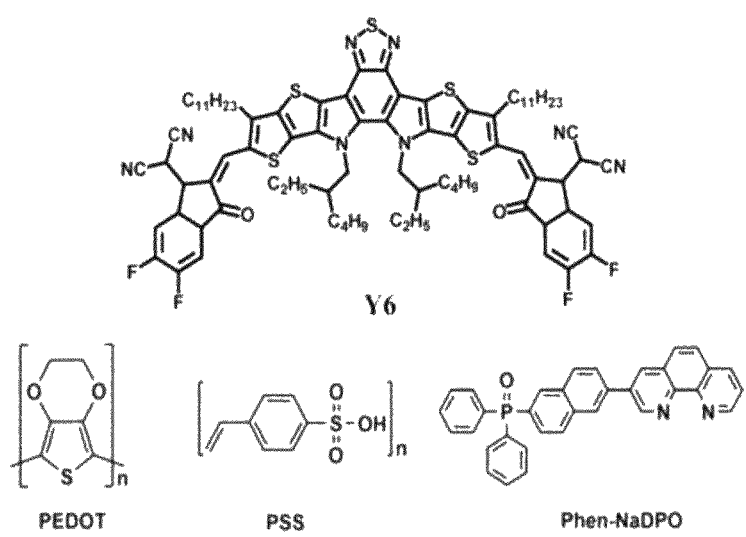
FIG. 2 shows molecular structures of materials Y6, PEDOT, PSS and Phen-NaDPO used in the application.

Chemical structural formulas of the Y6, the PEDOT, the PSS and the Phen-NaDPO are shown in FIG. 2.

According to the application, a preparation method of the organic solar cell device includes:

(a) cleaning the ITO glass: circulating ultrasonic cleaning the ITO glass with deionized water, the acetone and isopropyl alcohol for 30 minutes (min) respectively, and then treating the ITO glass in an ozone cleaner for 30 min;

(b) spin-coating the hole transport layer PEDOT:PSS on the ITO glass with a thickness of 10-30 nanometer (nm), optionally 30 nm in following embodiments, and then thermal annealing the hole transport layer in air;

(c) spin-coating a mixture of active layer donor:Y6 on the hole transport layer PEDOT:PSS by a solution method in a glove box filled with the nitrogen, specifically including dissolving the donor:Y6 in chlorobenzene or the chloroform with a concentration of 17 mg/mL, in which a mass ratio of the donor to the Y6 is 1:1.2, in which a thickness of the active layer is 80-300 nm, optionally 150 nm in the following embodiments;

(d) spin-coating a Phen-NaDPO isopropanol solution on the active layer to prepare the electron transport layer with a thickness of 10-50 nm, optionally 30 nm in the following embodiments.

(e) evaporating an Ag electrode on the Phen-NaDPO electron transport layer with a thickness of 90-100 nm, optionally 100 nm in the following embodiments.

Raw material compounds, the organic solvent, the catalyst, electrode materials, modification layer materials, etc. used in the application are directly purchased from market.

The technical schemes of the present application are clearly and completely described below with reference to the drawings and embodiments.

It should be understood that the technical schemes of the present application are not limited to the limits of the above specific embodiments, and any technical variations made according to the technical solutions of the present application, without departing from the scope protected by the objective and claims of the present application, fall within the scope of protection of the present application.

Embodiment 1 Preparing the Ternary Polymer Donor Material

As shown in FIG. 1, the preparing the ternary polymer donor material includes:

(1) the Stille cross-coupling reaction: dissolving the compound (I), the compound (II) and the compound (III) in the organic solvent, adding the different catalysts into the organic solvent, heating at 110° C., stirring and refluxing under the nitrogen, in which the organic solvent is the anhydrous oxygen-free toluene; when the catalyst is tetraphenylphosphonium, a dosage of the tetraphenylphosphonium is 10% of the total molar content of the compound (I), the compound (II) and the compound (III), and the reaction duration is 1-3 h; when the catalyst is the combination of tri(o-methylphenyl) phosphorus and tri(dibenzylideneacetone) dipalladium, dosages of the tri(o-methylphenyl) phosphorus and the tri(dibenzylideneacetone) dipalladium are 8% and 4% of the total molar content of the compound (I), the compound (II) and the compound (III) respectively, and the reaction duration is 0.5-1 h;

(2) the separating and purifying the reaction solution: stopping heating after the reaction, pouring the reaction solution into the methanol when the reaction system is cooled to the room temperature to generate the precipitate, filtering and collecting the precipitate, extracting the precipitate with the methanol, the acetone and the n-hexane by the Soxhlet extractor for 12 h respectively, and removing the products with the low molecular weights; extracting the solution in the Soxhlet extractor with the chloroform until the solution is colorless, and removing the chloroform by the rotary evaporation to obtain the crude products, chromatographing the crude products by the silica gel columns with 100-200 meshes, in which the pure chloroform is used as the eluent, then separating through the column, and collecting the effluent components to obtain the ternary polymer donor material PM6.1, PM6.2, PM6.5 and PM6.8 with the uniform molecular weights respectively.

As shown in Table 1, the molar ratio of the used compound I and the compound II are adjusted to obtain the ternary polymer donor material PM6.1, PM6.2, PM6.5 and PM6.8 with the following $M_n$ of 28.32 kDa, 31.28 kDa, 30.17 kDa and 35.80 kDa respectively, in which M is test results of high temperature gel permeation chromatography (GPC).

TABLE 1

| Ternary polymer onor material | Proportion of x component | Proportion of y component |
|---|---|---|
| PM6 | 100% | 0% |
| PM6.1 | 90% | 10% |
| PM6.2 | 80% | 20% |
| PM6.5 | 50% | 50% |
| PM6.8 | 20% | 80% |
| PM7 | 0% | 100% |

Among them, the ternary polymer donor material PM6 and ternary polymer donor material PM7 are directly purchased from the market and have following representation data:

PM6: ($M_n$=29.38 kDa)

$^1$H NMR (400 MHz, CDCl$_3$), 6.95-7.1 (d, 1H, =CH—), 3.5-3.65 (m, 12H, CH$_2$), 2.84-2.99 (m, 10H, CH$_2$), 1.57-1.98 (m, 12H, CH$_3$), 0.66-1.54 (m, 32H, CH$_2$ and CH$_3$);

elemental analysis (%): theoretical values: C=67.27%, H=6.61%, S=20.52%; test values: C=67.47%, H=6.33%, S=20.92%.

PM7: ($M_n$=40.23 kDa)

$^1$H NMR (400 MHz, CDCl$_3$), δ 7.45-7.65 (s, 4H, =CH—), 3.5-3.65 (m, 10H, CH$_2$), 2.84-2.99 (m, 14H, CH$_2$), 1.57-1.98 (m, 16H, CH$_3$), 0.66-1.54 (m, 36H, CH$_2$ and CH$_3$);

the elemental analysis (%): the theoretical values: C=65.54%, H=6.44%, S=19.99%; the test values: C=65.12%, H=6.40%, S=20.16%.

Representation data of the ternary polymer donor material PM6.1, PM6.2, PM6.5 and PM6.8 are as follows.

The ternary polymer donor material PM6.1: ($M_n$=28.32 kDa)

$^1$H NMR (400 MHz, CDCl$_3$), δ 7.45-7.65 (s, 1H, =CH—), 6.95-7.1 (d, 9H, =CH—), 3.5-3.65 (m, 15H, CH$_2$), 2.84-2.99 (m, 34H, CH$_2$), 1.57-1.98 (m, 10H, CH$_3$), 0.66-1.54 (m, 40H, CH$_2$ and CH$_3$);

the elemental analysis (%): the theoretical values: C=66.81%, H=6.38%, S=20.86%; the test values: C=66.37%, H=6.25%, S=20.77%.

The ternary polymer donor material PM6.2:($M_n$=31.28 kDa)

$^1$H NMR (400 MHz, CDCl$_3$), δ 7.45-7.65 (s, 1H, =CH—), 6.95-7.1 (d, 4H, =CH—), 3.5-3.65 (m, 8H, CH$_2$), 2.84-2.99 (m, 18H, CH$_2$), 1.57-1.98 (m, 5H, CH$_3$), 0.66-1.54 (m, 52H, CH$_2$ and CH$_3$);

the elemental analysis (%): the theoretical values: C=66.62%, H=6.38%, S=20.80%; the test values: C=66.20%, H=6.33%, S=20.92%.

The ternary polymer donor material PM6.5:($M_n$=30.17 kDa)

$^1$H NMR (400 MHz, CDCl$_3$), δ 7.45-7.65 (s, 1H, =CH—), 6.95-7.1 (d, 1H, =CH—), 3.5-3.65 (m, 16H, CH$_2$), 2.84-2.99 (m, 33.5H, CH$_2$), 1.57-1.98 (m, 12H, CH$_3$), 0.66-1.54 (m, 38H, CH$_2$ and CH$_3$);

the elemental analysis (%): the theoretical values: C=66.23%, H=6.63%, S=20.50%; the test values: C=66.16%, H=6.83%, S=20.32%.

The ternary polymer donor material PM6.8: ($M_n$=35.80 kDa)

$^1$H NMR (400 MHz, CDCl$_3$), δ 7.45-7.65 (s, 4H, =CH—), 6.95-7.1 (d, 1H, =CH—), 3.5-3.65 (m, 8H, CH$_2$), 2.84-2.99 (m, 18H, CH$_2$), 1.57-1.98 (m, 6H, CH$_3$), 0.66-1.54 (m, 54H, CH$_2$ and CH$_3$);

the elemental analysis (%): the theoretical values: C=65.57%, H=6.27%, S=20.47%; the test values: C=65.37%, H=6.40%, S=20.81%.

Embodiment 2 Preparing the PM6.1:Y6 Organic Solar Cell Device

Ultrasonic cleaning a substrate composed of a transparent substrate layer and a ITO transparent conductive electrode with a cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 revolutions per minute (rpm) for 20 seconds (s) in the air, thermal annealing the hole transport layer in the air at 150° C. for 10 min, then transferring samples into the glove box filled with the nitrogen, and spin-coating the PEDOT:PSS hole transport layer at 3200 rpm to prepare the active layer (PM 6.1:Y6=1:1.2, 17 mg ml$^{-1}$, chloroform as solvent, 0.5 percent by volume (% vol) of chloronaphthalene additive (CN)); thermal annealing the active layer and the substrate at 100° C. for 10 min after spin-coating the active layer; then, spin-coating the electron transport layer DPO on the active layer at 2000 rpm for 20 s, and evaporating the Ag electrode with a thickness of 100 nm on the electron transport layer to obtain the PM6.1:Y6 organic solar cell device.

Embodiment 3 Preparing the PM6.2:Y6 Organic Solar Cell Device

Ultrasonic cleaning the substrate composed of the transparent substrate layer and the ITO transparent conductive electrode with the cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 rpm for 20 s in the air, thermal annealing the hole transport layer in the air at 150° C. for 10 min, then transferring the samples into the glove box filled with the nitrogen, and spin-coating the PEDOT:PSS hole transport layer at 3200 rpm to prepare the active layer (PM 6.2:Y6=1:1.2, 17 mg ml$^{-1}$, the chloroform as solvent, 0.5% vol of the chloronaphthalene additive (CN)); thermal annealing the active layer and the substrate at 100° C. for 10 min after spin-coating the active layer, and evaporating the Ag electrode with the thickness of 100 nm on the electron transport layer to obtain the PM6.2:Y6 organic solar cell device.

Embodiment 4 Preparing the PM6.5:Y6 Organic Solar Cell Device

Ultrasonic cleaning the substrate composed of the transparent substrate layer and the ITO transparent conductive electrode with the cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 rpm for 20 s in the air, thermal annealing the hole transport layer in the air at 150° C. for 10 min, then transferring the samples into the glove box filled with the nitrogen, and spin-coating the PEDOT:PSS hole transport layer at 3200 rpm to prepare the active layer (PM 6.5:Y6=1:1.2, 17 mg ml$^{-1}$, the chloroform as solvent, 0.5% vol of chloronaphthalene additive (CN)); thermal annealing the active layer and the substrate at 100° C. for 10 min after spin-coating the active layer; then, spin-coating the electron transport layer DPO on the active layer at 2000 rpm for 20 s, and evaporating the Ag electrode with the thickness of 100 nm on the electron transport layer to obtain the PM6.5:Y6 organic solar cell device.

Embodiment 5 Preparing the PM6.8:Y6 Organic Solar Cell Device

Ultrasonic cleaning the substrate composed of the transparent substrate layer and the ITO transparent conductive electrode with the cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 rpm for 20 s in the air, thermal annealing the hole transport layer in the air at 150° C. for 10 min, then transferring the samples into the glove box filled with the nitrogen, and spin-coating the PEDOT:PSS hole transport layer at 3200 rpm to prepare the active layer (PM 6.8:Y6=1:1.2, 17 mg ml$^{-1}$, the chloroform as solvent, 0.5% vol of chloronaphthalene additive (CN)); thermal annealing the active layer and the substrate at 100° C. for 10 min after spin-coating the active layer; then, spin-coating the electron transport layer DPO on the active layer at 2000 rpm for 20 s, and evaporating the Ag electrode with the thickness of 100 nm on the electron transport layer to obtain the PM6.8:Y6 organic solar cell device.

Embodiment 6 Preparing the PM6:Y6 Organic Solar Cell Device

Ultrasonic cleaning the substrate composed of the transparent substrate layer and the ITO transparent conductive electrode with the cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 rpm for 20 s in the air, thermal annealing the hole transport layer in the air at 150° C. for 10 min, then transferring the samples into the glove box filled with the nitrogen, and spin-coating the PEDOT:PSS hole transport layer at 3200 rpm to prepare the active layer (PM 6:Y6=1:1.2, 17 mg ml$^{-1}$, the chloroform as solvent, 0.5% vol of chloronaphthalene additive (CN)); thermal annealing the active layer and the substrate at 100° C. for 10 min after spin-coating the active layer; then, spin-coating the electron transport layer DPO on the active layer at 2000 rpm for 20 s, and evaporating the Ag electrode with the thickness of 100 nm on the electron transport layer to obtain the PM6:Y6 organic solar cell device.

Embodiment 7 Preparing the PM7:Y6 Organic Solar Cell Device

Ultrasonic cleaning the substrate composed of the transparent substrate layer and the ITO transparent conductive electrode with the cleaning solution, the deionized water, the acetone and the isopropanol respectively, and then drying the substrate with the nitrogen; treating the substrate in the ozone cleaner for 30 min, spin-coating the hole transport layer PEDOT:PSS on the substrate at 4000 rpm for 20 s in the air, thermal annealing the hole transport layer in the air at 150° C. for 10 min, then transferring the samples into the glove box filled with the nitrogen, and spin-coating the PEDOT:PSS hole transport layer at 3200 rpm to prepare the active layer (PM 7:Y6=1:1.2, 17 mg ml$^{-1}$, the chloroform as solvent, 0.5% vol of chloronaphthalene additive (CN)); thermal annealing the active layer and the substrate at 100° C. for 10 min after spin-coating the active layer; then, spin-coating the electron transport layer DPO on the active layer at 2000 rpm for 20 s, and evaporating the Ag electrode with the thickness of 100 nm on the electron transport layer to obtain the PM7:Y6 organic solar cell device.

In the Embodiments 2-7, an effective thickness of the active layer is tested by a step profiler, and an effective area of the organic solar cell device is 0.08636 cm$^2$.

Figure 4:
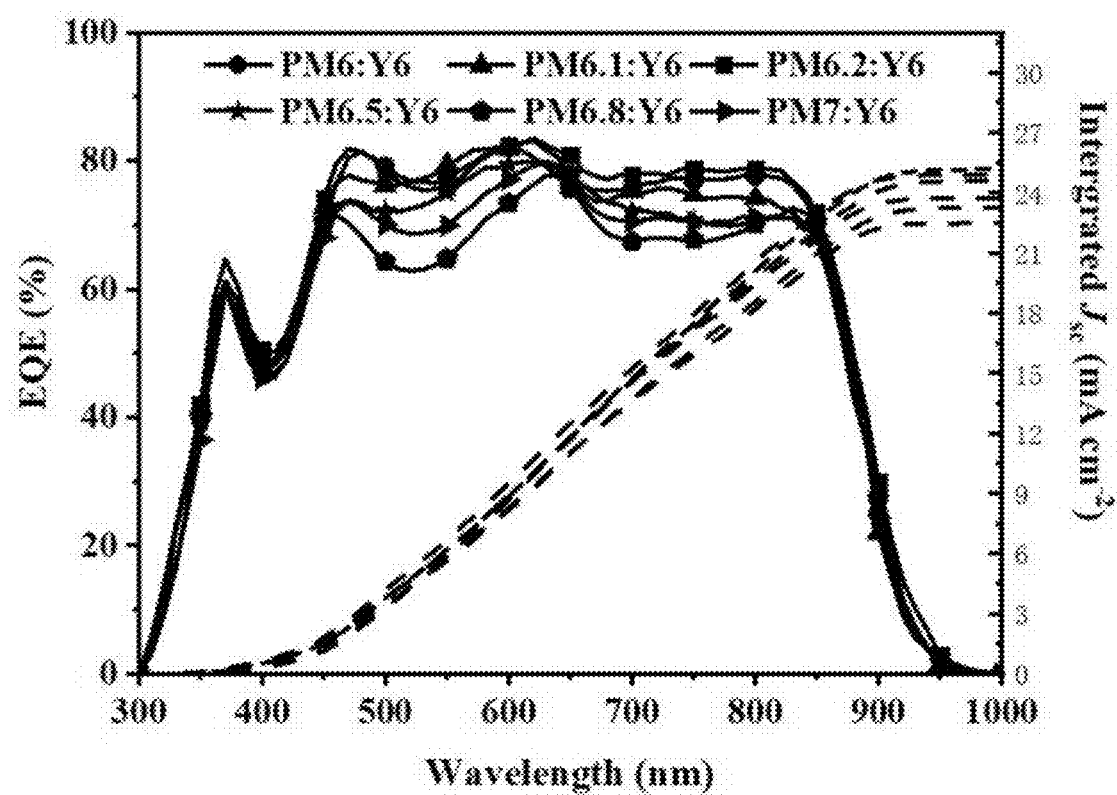
FIG. 4 shows current density-voltage (J-V) curves of an organic solar cell device in Embodiment 2 (PM6.1:Y6), Embodiment 3 (PM6.2:Y6), Embodiment 4 (PM6.5: Y6) and Embodiment 5 (PM6.8:Y6) under standard test conditions (air mass (AM) 1.5, 100 megawatt per square centimetre (mW/cm$^2$)).
Figure 5:
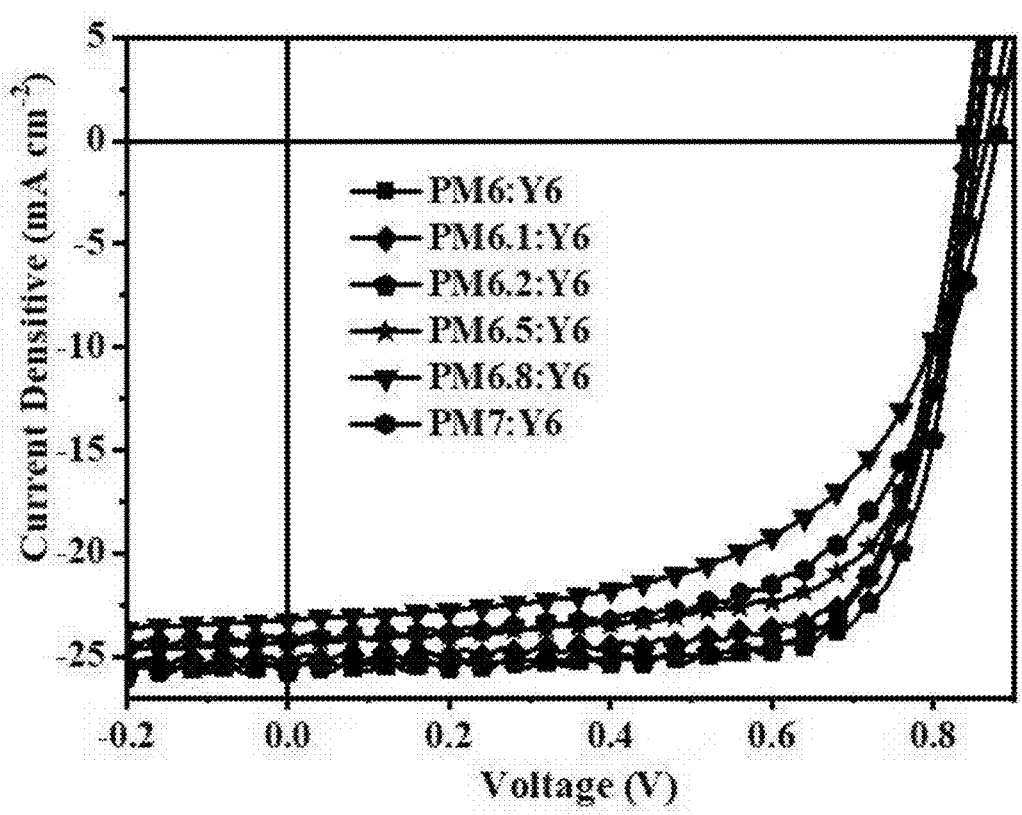
FIG. 5 shows EQE curves of an organic solar cell device in Embodiment 2 (PM6.1:Y6), Embodiment 3 (PM6.2:Y6), Embodiment 4 (PM6.5: Y6) and Embodiment 5 (PM6.8:Y6) under standard test conditions (AM 1.5, 100 mW/cm$^2$).

Under irradiation conditions of standard sunlight (AM 1.5 Global (G), a light intensity 100 mW cm$^{-2}$), performance of the organic solar cell device in the Embodiments 2-5 is tested by using a Keithley 2400 digital source meter controlled by a computer, and current density-voltage (J-V) curves of the organic solar cell device are shown in FIG. 4. A new organic solar cell device is tested by external quantum efficiency (EQE) (Beijing Zolix Instrument CO., LTD., Solar Cell Scan 100), and an external quantum efficiency curve of the new organic solar cell device is shown in FIG. 5, and photovoltaic performance parameters of the new organic solar cell device are shown in Table 2.

TABLE 2

Photovoltaic performance parameters of the organic solar cell device

| Active layer | $V_{OC}$ (mV) | $J_{sc}$ (mA cm$^{-2}$) | FF (%) | $PCE_{Max}$ (%) | $PCE_{Ave}$ (%) | EQE (mA cm$^{-2}$) |
|---|---|---|---|---|---|---|
| PM6.1:Y6 | 0.843 | 25.29 | 71.5 | 15.27 | 15.17 ± 0.1 | 24.62 |
| PM6.2:Y6 | 0.851 | 25.78 | 73.5 | 16.13 | 16.03 ± 0.1 | 25.20 |
| PM6.5:Y6 | 0.855 | 24.37 | 68.6 | 14.29 | 14.09 ± 0.2 | 23.76 |
| PM6.8:Y6 | 0.865 | 23.25 | 58.22 | 11.71 | 11.41 ± 0.3 | 23.27 |
| PM6:Y6 | 0.842 | 25.41 | 72.9 | 15.56 | 15.35 ± 0.2 | 24.92 |
| PM7:Y6 | 0.885 | 24.26 | 54.6 | 13.36 | 13.16 ± 0.2 | 23.91 |

FIG. 5 shows the EQE curves of the organic solar cell device of Embodiments 2-5, which have a wide photocurrent response from 300-1000 nm. It may be seen from the FIG. 5 that a EQE of the PM6.2:Y6 organic solar cell device is slightly higher than EQEs of the PM6.1:Y6 organic solar cell device, the PM6.5:Y6 organic solar cell device and the PM6.8:Y6 organic solar cell device, indicating that a ratio of the number of electrons collected by the PM6.2:Y6 organic solar cell device to the number of incident photons is higher than ratios of the number of electrons collected by the PM6.1:Y6 organic solar cell device, the PM6.5:Y6 organic solar cell device and the PM6.8:Y6 organic solar cell device to the number of the incident photons. By integrating the EQE curves, the $J_{SC}$ values of the post-processed PM6.1:Y6 organic solar cell device, the post-processed PM6.2:Y6 organic solar cell device, the PM6.5:Y6 organic solar cell device and the PM6.8:Y6 organic solar cell device are 24.62 mA·cm$^{-2}$, 25.20 mA·cm$^{-2}$, 23.76 mA·cm$^{-2}$ and 23.27 mA·cm$^{-2}$, respectively, and compared with $J_{SC}$ values of the J-V curves, their $J_{SC}$ values errors are all within 5%. Above results show that molecular energy levels of the ternary polymeric donor material are effectively adjusted by controlling contents of the BDT-2Cl, thereby showing graded voltage change. Under conditions of the similar molecular weights, the PM6.2:Y6 organic solar cell device shows the best device performance of 16.13%, and achieves the best synergistic effect between the F and the Cl, that is, the organic solar cell device composed of 20% BDT-2Cl and 80% 2BDT-2F achieves the balance between the driving force and the energy loss.

Photoelectric conversion efficiency of the PM6.2:Y6 organic solar cell device is higher than photoelectric conversion efficiency of the commercial materials PM6:Y6 and PM7:Y6 organic solar cell device, which shows that the ternary polymer donor material prepared by the synergistic effect of the F and Cl may effectively improve the device performance and has great commercial application potential.

It should be understood that the technical schemes of the present application are not limited to the limits of the above specific embodiments, and any technical variations made according to the technical schemes of the present application, without departing from the scope protected by the objective and claims of the present application, fall within the scope of protection of the present application.

What is claimed is:

1. A ternary polymer donor material, comprising a following chemical structural formula:

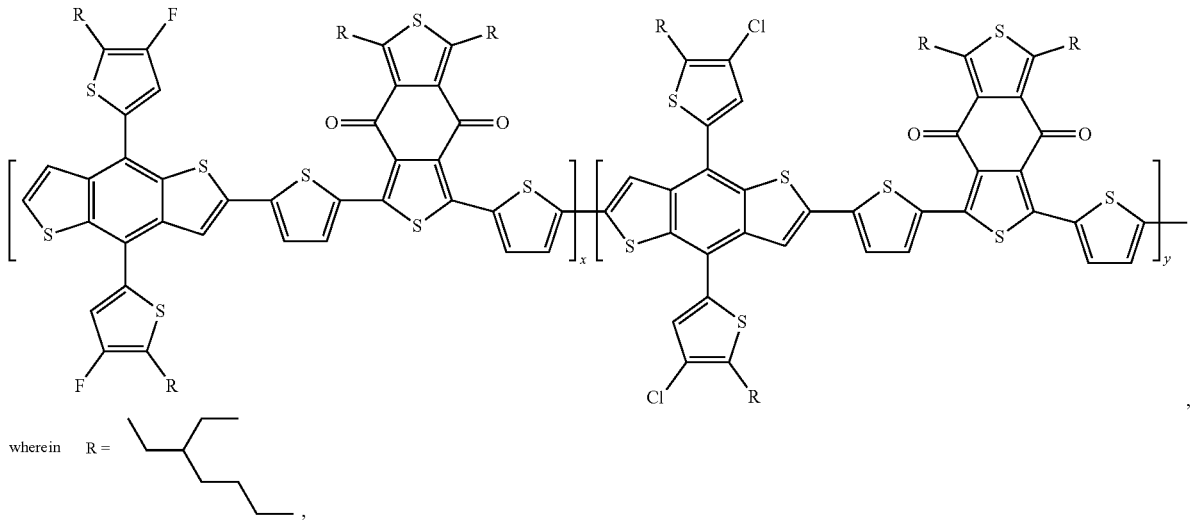

wherein R = wherein a component x accounts for 90-20 percent (%) of a molar content of the ternary polymer donor material, and a component y accounts for 10-80% of the molar content of the ternary polymer donor material.

2. The ternary polymer donor material according to claim 1, wherein the component x and the component y account for 90% and 10%, 80% and 20%, 50% and 50%, or 20% and 80% of the molar content of the ternary polymer donor material.

3. A preparation method of the ternary polymer donor material according to claim 1 by Stille cross-coupling reaction of a compound (I), a compound (II) and a compound (III), wherein the compound (I), the compound (II) and the compound (III) comprise following chemical structural formulas:

I

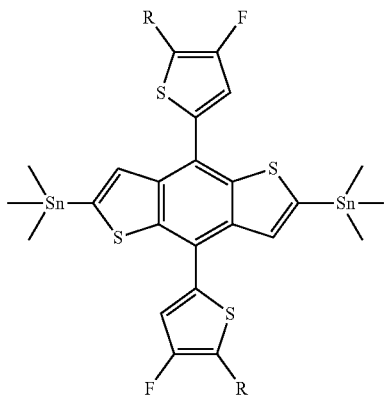

II

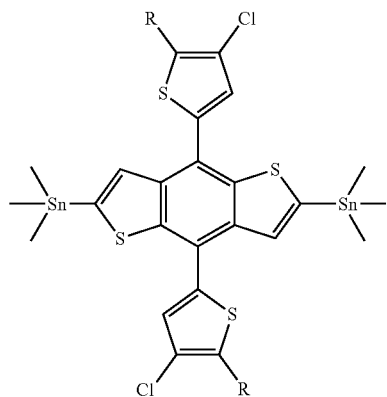

III

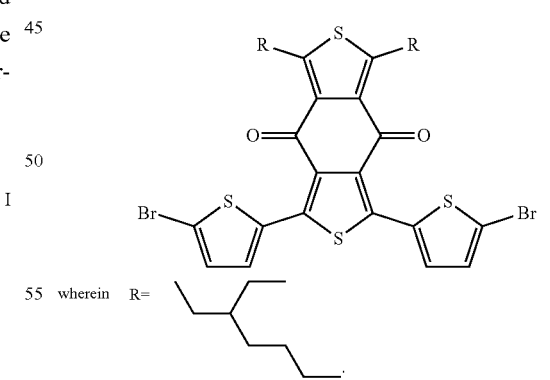

wherein R=

4. The preparation method according to claim 3, wherein the preparation method comprises: dissolving the compound (I), the compound (II) and the compound (III) in an organic solvent, adding a catalyst into the organic solvent, heating and stirring for reaction under an inert gas, and separating as well as purifying a reaction solution after the reaction to obtain the ternary polymer donor material.

5. The preparation method according to claim 4, wherein a molar ratio of the compound (I), the compound (II) and the compound (III) is (0.9-0.2):(0.1-0.8):1;

and/or the organic solvent is at least one of anhydrous oxygen-free toluene, N,N-dimethylformamide, tetrahydrofuran and anhydrous oxygen-free chlorobenzene;

and/or the catalyst is a palladium catalyst or a combination of the palladium catalyst and a phosphorus catalyst;

and/or an amount of the catalyst accounts for 2-20% of a total molar content of the compound (I), the compound (II) and the compound (III).

6. The preparation method according to claim 4, wherein a heating temperature during the heating is 100-120 degree Celsius (° C.), and a reaction duration of the reaction is more than or equal to 0.2 hour (h).

7. The preparation method according to claim 5, wherein when the catalyst is the palladium catalyst, a reaction duration of the reaction is 1-3 h; and when the catalyst is the combination of the palladium catalyst and the phosphorus catalyst, the reaction duration of the reaction is 0.2-1 h.

8. The preparation method according to claim 4, wherein the separating and purifying the reaction solution comprises:

stopping heating after the reaction, pouring the reaction solution into methanol when a reaction system is cooled to room temperature to generate a precipitate, filtering and collecting the precipitate, extracting the precipitate with the methanol, acetone and n-hexane in sequence by a Soxhlet extractor, removing products with low molecular weights, extracting the precipitate in the Soxhlet extractor with chloroform until the precipitate is colorless, removing the chloroform by rotary evaporation to obtain crude products, and chromatographing the crude products by silica gel columns to obtain the ternary polymer donor material.

* * * * *